United States Patent

[11] 3,627,806

| [72] | Inventor | Gary E. LeGrow<br>Midland, Mich. |
|---|---|---|
| [21] | Appl. No. | 888,939 |
| [22] | Filed | Dec. 29, 1969 |
| [45] | Patented | Dec. 14, 1971 |
| [73] | Assignee | Dow Corning Corporation<br>Midland, Mich. |

[54] CARBOXY-FUNCTIONAL HYDROLYZABLE SILANES
6 Claims, No Drawings

[52] U.S. Cl. ............................................. 260/448.2 B, 117/135.1
[51] Int. Cl. .................................................. C07f 7/18, C23c 11/06
[50] Field of Search ........................................... 260/448.2 B

[56] References Cited
UNITED STATES PATENTS

| 2,563,516 | 8/1951 | Burkhard | 260/448.2 B |
|---|---|---|---|
| 2,604,486 | 7/1952 | Burkhard | 260/448.2 B |

*Primary Examiner*—Tobias E. Levow
*Assistant Examiner*—Werten F. W. Bellamy
*Attorneys*—Robert F. Fleming, Jr., Laurence R. Hobey, Harry D. Dingman and Howard W. Hermann ABSTRACT: Silanes of the formula $(HOOC)_m RSR'Si(R''_n)Y_{3-n}$ are made by adding unsaturated acids to $HSR'Si(R''_n)Y_{3-n}$ or by adding mercapto carboxylic acids to alkenyl-$Si(R''_n)Y_{-n}$. For example, thioglycolic acid is added to vinyltrimethoxysilane in the presence of a free radical generator to give $HOOCCH_2SCH_2CH_2Si(OMe)_3$. The acids are used as adhesion promotors for silicon rubber.

CARBOXY-FUNCTIONAL HYDROLYZABLE SILANES

A primary utility for the silanes of this invention is the use as additives for unvulcanized silicone rubber to promote the adhesion of the cured rubber to substrate such a aluminum, steel and other metals. This use is described and claimed in the copending application of Keith E. Polmanteer Ser. No. 888,940, entitled "Room-Temperature Vulcanizable Silicone Rubber With Unprimed Adhesion," filed concurrently herewith. In addition the silanes can be used as intermediates in the preparation of silicone-alkyd resins, which in turn are used for paint vehicles and electrical insulation.

This invention relates to silanes of the formula $(HOOC)_m RSR'i(R''_n)Y_{3-n}$ in which R is a hydrocarbon radical having a valence of $m+1$, attached to the sulfur through an aliphatic or cycloaliphatic carbon atom, R' is a divalent hydrocarbon radical, R'' is a monovalent hydrocarbon or monovalent halohydrocarbon radical, n is an integer from 0 to 2, m is an integer from 1 to 2, and Y is selected from the group consisting of alkoxy radicals, alkoxy-alkoxy radicals, carboxyacyl radicals, and ketoxime radicals of the formula —ON C in which the unsatisfied valences of the carbon atom are satisfied with monovalent hydrocarbon radicals or the same divalent hydrocarbon radical, R, R', R'' and Y being free of C—C aliphatic unsaturation.

The compositions of this invention can be prepared by two methods. The first involves the addition of a carboxylic acid having alkenyl unsaturation to a mercapto hydrocarbyl silane in which the SH group is attached to silicon through a carbon atom. In carrying out this reaction if the acid is conjugated, for example, acrylic acid or methacrylic acid, care should be taken to avoid polymerization of the acid. This can be accomplished by employing a base catalyst, such as sodium methoxide. Ultraviolet light or other free radical generators can be employed if care is taken to avoid excessive polymerization of the acid. In using acids which are not conjugated, the best method is to employ free radical generators, such as ultraviolet light, azo-bisnitriles and peroxide.

The second method involves the addition of mercapto carboxylic acids, such as thioglycolic acid to an alkenyl silane such as allylsilane. This addition is best carried out in the presence of a free radical generator such as azo-bis-iso-butyronitrile, peroxides or ultraviolet light. In both of the above methods the temperature of addition takes place from room-temperature to 70° C., depending upon the free radical catalyst employed, and the reactivity of the silane and the acid used.

The first reaction can be illustrated by the equation
$(HOOC)_m RCH=CH_2 + HSR'Si(R''_n)Y_{3-n} \rightarrow (HOOC)_m RSR'Si(R''_n)Y_{3-n}$. In carrying out this reaction one can use any acid having aliphatic unsaturation. These include acids such as acrylic, methacrylic, $$HOOCC_6H_4CH=CH_2, HOOC(CH_2)_{15}CH=CH_2$$

or

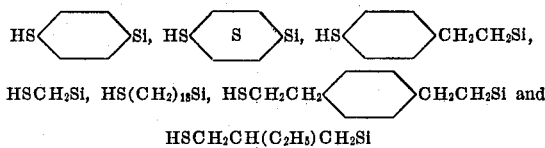

and itaconic acid.

The mercaptosilanes employed in this reaction can by any mercaptosilane in which the sulfur is attached to silicon through a carbon atom such as those having the structure

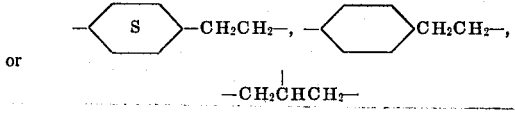

Thus it can be seen R can be any divalent or trivalent hydrocarbon radical attached to the sulfur through an aliphatic or cycloaliphatic carbon atom and can be any radical such as methylene, dimethylene, octadecamethylene, cyclohexalene,

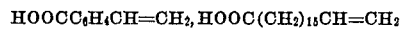

or

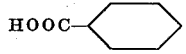

R' can be any divalent hydrocarbon radicals such as methylene, dimethylene, trimethylene, octa-decamethylene, phenylene, tolylene, xenylene, naphthylene, ethylidine, isopropylidene and cyclohexalene.

R'' can be any monovalent hydrocarbon radical free of aliphatic unsaturation such as alkyl radicals such as methyl, ethyl, isopropyl, octadecyl or myricyl; cycloaliphatic hydrocarbon radicals such as cyclopentyl, cyclohexyl or methylcyclohexyl; aryl hydrocarbon radicals such as phenyl, xenyl, tolyl, xylyl, naphthyl or anthracyl and aralkyl hydrocarbon radicals such as benzyl, 2-phenylethyl, or 2-phenylpropyl.

R'' can be any halogenated monovalent hydrocarbon radical free of aliphatic unsaturation such as haloalkyl radicals such as chloromethyl, 3-chloropropyl, bromoctadecyl, 3,3,3-trichloropropyl, chloroisopropyl or 2(perfluoroalkyl)- ethyl radicals in which the perfluoroalkyl radical is trifluoromethyl, perfluoroethyl, perfluoroisobutyl or perfluorooctadecyl; halocycloalkyl radicals such as bromocyclohexyl, chlorocyclopentyl or fluorocyclohexyl; haloaryl radicals such as 2,4-dichlorophenyl, dibromoxenyl, alpha, alpha, alpha-trifluorotolyl, iodonaphthyl and tetrachlorophenyl and haloaralkyl radicals such as 2(chlorophenyl)ethyl, p-chlorobenzyl or 2(bromophenyl)-propyl.

For the purpose of this invention Y can be any alkoxy group such as methoxy, ethoxy, isopropoxy, butoxy or octa-decyloxy; any alkoxyalkoxy radical such as beta-methoxyethoxy, beta-ethoxyethoxy, beta-butoxyethoxy, or $-(OCH_2CH_2)_2OCH_3$; any carboxy acyl radical such as formyloxy, acetoxy, propionyloxy, butyryloxy or octanoyloxy; or any ketoxime radical of the formula $-ON=C=$ in which the unsatisfied valences of the carbon atom are satisfied with two hydrocarbon radicals (i.e. $-ON=CZ_2$) such as alkyl radicals such as methyl, ethyl, isopropyl, dodecyl, or octadecyl, cycloalkyl radicals such as cyclopentyl and cyclohexyl; any aryl radicals such as phenyl, naphthyl, and xenyl; any aralkyl radicals such as benzyl, beta-phenylethyl, and beta-phenylpropyl; and any alkaryl radicals such as tolyl, and dimethylphenyl; or the same divalent hydrocarbon radical $$(\text{i.e. } ON=C\ Z')$$

in which Z' is propylene, chlorohexylene or octadecamethylene. For a complete list of operative ketoxime radicals one should refer to U.S. Pat. No. 3,189,576, which is hereby incorporated in its entirety by reference.

It is preferable that R, R', R'' and Y contain no more than 18 carbon atoms.

The following examples are illustrative only and should not be construed as limiting the invention which is properly delineated in the appended claims.

Example 1

This example illustrates the first method of preparing the silanes of this invention. Three hundred and ninety-two grams of 3-mercaptopropyltrimethoxysilane was added with stirring over a period of 2 hours to a solution of 0.25 g. of sodium methoxide in 144 g. of glacial acrylic acid. An exotherm occurred to a maximum temperature of 72° C. during the addition. The water white product had the formula $(MeO)_3Si(CH_2)_3SCH_2CH_2COOH$ which had the following properties: $n_d^{25}$ of 1.4609, $d_4^{25}$ of 1.12, visc. of 26.5 cs. at 25° C. and $R_D$ observed of 0.2450.

Example 2

This example illustrates the second method of preparing the compositions of this invention.

47.5 g. of mercapto acetic acid, 120 g. of vinyltriacetoxysilane and 0.05 g. of azo-bis-isobutyronitrile were mixed and heated at 60° C. for 1 hour and then cooled. The product had the formula $HOOCCH_2SCH_2CH_2Si(OOCCH_3)_3$ and had a refractive index of $n_D^{25}$ of 1.4613. The structure of the product was established by nuclear magnetic resonance data.

Example 3

Two hundred and ninety-six grams of vinyl trimethoxysilane was added with stirring to a mixture of 184 g. of mercapto acetic acid containing 0.1 g. of azo-bis-isobutyronitrile. The mixture exothermed, but the temperature was not allowed to exceed 50° C. On complete addition a clear, colorless product was obtained having the formula $HOOCCH_2SCH_2CH_2Si(OMe)_3$ and having the following properties: $n_D^{25}$ 1.4635, $d_4^{25}$ 1.150 $R_D$ observed 0.2397.

Example 4

Eighty-eight grams of methallyl trimethoxysilane was added with stirring to 46 g. of mercaptoacetic acid containing 0.05 g. of azo-bis-butyronitrile. The mixture was not allowed to heat above 50° C. The product was a colorless fluid having the formula $HOOCCH_2SCH_2CH(Me)CH_2Si(OMe)_3$ having the following properties: $n_D^{25}$ 1.4547, $d_4^{25}$ 1.107, and $R_D$ observed 0.2449.

Example 5

Seventy-four grams of vinyl trimethoxysilane was added dropwise with stirring to a solution of 75 g. of thiomalic acid in 150 g. of methanol containing 0.05 g. of azo-bis-isobutyronitrile. Irradiation with an infrared lamp caused evolution of heat to a maximum of 50° C. The methanol solvent was removed at reduced pressured leaving a highly viscous product having the $n^{25}$ of 1.4485 and shown by nuclear magnetic resonance spectra to have the formula

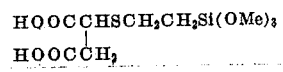

Example 6

When the following acids are reacted with the following mercaptosilanes in accordance with the procedure of example 1, the following products are obtained. In the tables the following abbreviations are used; Me for methyl, Et for ethyl and Ph for phenyl.

TABLE 1

| Acid | Mercaptosilane | Product |
|---|---|---|
| $HOOCC(Me)=CH_2$ | $HSCH_2Si(ON=CMe_2)_2$ (Me) | $HOOCCH(Me)CH_2SCH_2Si(Me)(ON=CMe_2)_2$ |
| $HOOCC_6H_4CH=CH_2$ | $HSC_6H_4Si(OMe)_3$ | $HOOCC_6H_4CH_2CH_2SC_6H_4Si(OMe)_3$ |
| $HOOCCH_2CCOOH$ (=CH_2) | $HSCH_2CH_6H_4(CH_2)_2Si(OC_6H_{13})$ (Me_2) | $HOOCCHCH_2SCH_2C_6H_4(CH_2)_2Si(Me)_2(OC_6H_{13})$ / $HOOCCH_2$ |
| $HOOCCH=CH_2$ | $HS(CH_2)_3Si(OOCC_2H_5)_2$ (Ph) | $HOOC(CH_2)_2S(CH_2)_3Si(Ph)(OOCC_2H_5)_2$ |
| $HOOCCH=CH_2$ | $HS(CH_2)_3(CF_3CH_2CH_2)Si(OMe)_2$ $HS(CH_2)_3(ClC_6H_4)Si(OMe)_2$ $HS(CH_2)_3(BrC_6H_{10})Si(OMe)_2$ $HS(CH_2)_3(C_6H_5CH_2CH_2)Si(OMe)_2$ | $HOOC(CH_2)_2S(CH_2)_3Si(CH_2CH_2CF_3)(OMe)_2$ $HOOC(CH_2)_2S(CH_2)_3Si(C_6H_4Cl)(OMe)_2$ $HOOC(CH_2)_2S(CH_2)_3Si(C_6H_{10}Br)(OMe)_2$ $HOOC(CH_2)_2S(CH_2)_3Si(CH_2CH_2C_6H_5)(OMe)_2$ |

Example 7

When the following acids are reacted with the following mercapto hydrocarbylsilanes employing azo-bis-isobutronitrile as a catalyst the following products are obtained.

TABLE 2

| Acid | Mercaptosilane | Product |
|---|---|---|
| $HOOCC_{15}H_{30}CH=CH_2$ $HOOCC_6H_{10}CH=CH_2$ | $HSC_{18}H_{36}Si(OEt)_3$ $HSC_6H_{10}Si(OCH_2CH_2OMe)_3$ | $HOOCC_{17}H_{34}SC_{18}H_{36}Si(OEt)_3$ $HOOCC_6H_{10}CH_2CH_2SC_6H_{10}Si(OCH_2CH_2OMe)_3$ |
| $HOOCCH_2CH=CH_2$ | $HSCH_2Si(C_{18}H_{36})(ON=C\overline{\ \ C_5H_{10}})_2$ | $HOOC(CH_2)_3SCH_2Si(C_{18}H_{36})(ON=C\overline{\ \ C_5H_{10}})_2$ |
| Same as above | $HS(CH_2)_3Si(CH_2CH_2CH_2Cl)(OOCC_5H_{11})_2$ | $HOOC(CH_2)_3S(CH_2)_3Si(CH_2CH_2CH_2Cl)(OOCC_5H_{11})_2$ |
| | | 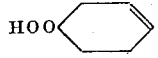 |
| $HOOCCH_2CH=CH_2$ | $HSCH_2Si(C_6H_4CF_3)(ON=CPh_2)_2$ | $HOOC(CH_2)_3SCH_2Si(C_6H_4CF_3)(ON=CPh_2)_2$ |

That which is claimed is:

1. A silane of the formula
$$(HOOC)_m RSR'Si(R''_n)Y_{3-n}$$ in which
R is a hydrocarbon radical having a valence of $m+1$ which is attached to the sulfur through an aliphatic or cycloaliphatic carbon atom,
R' is a divalent hydrocarbon radical,
R'' is a monovalent hydrocarbon or monovalent halohydrocarbon radical,
n is an integer from 0 to 2,
m is an integer from 1 to 2, and
Y is an alkoxy radical and alkoxyalkoxy radical, a carboxyacyl radical or a ketoxime radical of the formula —ON═C in which the unsatisfied valences of the carbon atom are satisfied with monovalent hydrocarbon radicals or the same divalent hydrocarbon radical, R, R', R'' and Y being free of C—C aliphatic unsaturation.

2. A silane in accordance with claim 1 which is of the formula $HOOCCH_2CH_2S(CH_2)_3Si(OCH_3)_3$.

3. A silane in accordance with claim 1 which is of the formula $HOOCCH_2S(CH_2)_2Si(OOCCH_3)_3$.

4. A silane in accordance with claim 1 in which the formula $HOOCCH_2S(CH_2)_2Si(OCH_3)_3$.

5. A silane in accordance with claim 1 which is of the formula $HOOCH_2SCH_2CH(CH_3)CH_2Si(OCH_3)_3$.

6. A silane in accordance with claim 1 which is of the formula

\* \* \* \* \*